US010499572B2

(12) United States Patent
Charling et al.

(10) Patent No.: US 10,499,572 B2
(45) Date of Patent: Dec. 10, 2019

(54) CONTROL SYSTEM FOR CONTROLLING OPERATION OF AN IRRIGATION SYSTEM

(71) Applicant: LINDSAY CORPORATION, Omaha, NE (US)

(72) Inventors: Kurtis Charling, Omaha, NE (US); Sam Haidar, Omaha, NE (US); Brian Magnusson, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 60 days.

(21) Appl. No.: 15/859,869

(22) Filed: Jan. 2, 2018

(65) Prior Publication Data

US 2018/0184600 A1    Jul. 5, 2018

Related U.S. Application Data

(60) Provisional application No. 62/442,252, filed on Jan. 4, 2017.

(51) Int. Cl.
| | |
|---|---|
| *A01G 25/16* | (2006.01) |
| *G05D 7/06* | (2006.01) |
| *A01G 25/09* | (2006.01) |
| *G06Q 30/02* | (2012.01) |

(52) U.S. Cl.
CPC ......... *A01G 25/167* (2013.01); *A01G 25/092* (2013.01); *G05D 7/0635* (2013.01); *G06Q 30/0202* (2013.01); *G06Q 30/0283* (2013.01)

(58) Field of Classification Search
CPC .. A01G 25/092; A01G 25/167; G05D 1/0217; G05D 2201/0201; G05D 7/0635; G06Q 30/0202; G06Q 30/0283
See application file for complete search history.

(56) References Cited

U.S. PATENT DOCUMENTS

| | | | | |
|---|---|---|---|---|
| 2006/0122735 | A1* | 6/2006 | Goldberg | ............... A01G 25/16 700/284 |
| 2012/0290140 | A1* | 11/2012 | Groeneveld | ........... A01G 22/00 700/284 |
| 2012/0303168 | A1* | 11/2012 | Halahan | ............... A01G 25/165 700/284 |
| 2017/0006787 | A1* | 1/2017 | Weiler | ................... A01G 25/16 |

* cited by examiner

*Primary Examiner* — Chun Cao
(74) *Attorney, Agent, or Firm* — Hovey Williams LLP (57) ABSTRACT

An irrigation system for providing irrigation to a crop comprising a plurality of mobile support towers, a conduit, a plurality of drive motors, a plurality of sensors, and a control system. The conduit carries fluid and is supported by the mobile support towers. The conduit includes a valve which can be opened to allow fluid flow through the conduit and closed to prevent fluid flow through the conduit. The drive motors propel the mobile support towers. The sensors generate data regarding the amount of fluid used to irrigate the crop. The control system controls the operation of the valve and the drive motors and is configured to calculate a price of forecasted yield loss, calculate a cost of irrigation, and terminate irrigation if the cost of irrigation is greater than the price of the forecasted yield loss.

8 Claims, 6 Drawing Sheets

| CROP | Ky | CROP | Ky |
|---|---|---|---|
| ALFALFA | 1.1 | SAFFLOWER | 0.8 |
| BANANA | 1.2-1.35 | SORGHUM | 0.9 |
| BEANS | 1.15 | SOYBEAN | 0.85 |
| CABBAGE | 0.95 | SPRING WHEAT | 1.15 |
| COTTON | 0.85 | SUGARBEET | 1.0 |
| GROUNDNUTS | 0.7 | SUGARCANE | 1.2 |
| MAIZE | 1.25 | SUNFLOWER | 0.95 |
| ONION | 1.1 | TOMATO | 1.05 |
| PEAS | 1.15 | WATERMELON | 1.1 |
| PEPPER | 1.1 | WINTER WHEAT | 1.05 |
| POTATO | 1.1 | | |

FIG. 4

| CROP | WHOLE SEASON | | | INITIAL CROP STAGE | | | CROP DEVELOPMENT | | | MID SEASON | | | LATE SEASON | | |
|---|---|---|---|---|---|---|---|---|---|---|---|---|---|---|---|
| | FAO | IAEA | (%) | FAO | IAEA | (%) | FAO | IAEA | (%) | FAO | IAEA | (%) | FAO | IAEA | (%) |
| BEANS | 1.15 | 0.59 | -49 | 0.2 | 0.38 | 90 | 1.1 | 1.75 | 50 | 0.75 | 1.44 | 92 | 0.2 | 0.06 | -70 |
| | 1.15 | 1.43 | 24 | 0.2 | 0.56 | 180 | 1.1 | 1.35 | 23 | 0.75 | 0.87 | 16 | 0.2 | 0.17 | -15 |
| | 0.85 | 1.02 | 20 | 0.2 | 0.75 | 275 | 0.5 | 0.48 | -4 | | | | 0.25 | | |
| COTTON | 0.85 | 0.71 | -16 | 0.2 | 0.8 | 300 | 0.5 | 0.6 | 20 | | 0.05 | | | | |
| | 0.85 | 0.99 | 16 | | | | 0.5 | 0.76 | 52 | | | | | | |
| GROUNDNUT | 0.7 | | | 0.2 | | | 0.8 | 0.74 | -8 | 0.6 | | | 0.2 | | |
| MAIZE | 1.25 | 1.33 | 6 | 0.4 | | | 1.5 | | | 0.5 | | | 0.2 | | |
| POTATO | 1.1 | | | 0.6 | 0.4 | -33 | | 0.33 | | 0.7 | 0.46 | -34 | 0.2 | | |
| SOYBEAN | 0.85 | | | 0.2 | 0.56 | 180 | 0.8 | 1.13 | 41 | 1 | 1.76 | 76 | | | |
| SUGARCANE | 1.2 | | | 0.75 | 0.2 | -73 | | 1.2 | | 0.5 | 1.2 | 140 | 0.2 | | |
| | 1.2 | | | 0.75 | 0.4 | -47 | | 1.2 | | 0.5 | 1.2 | 140 | | | |
| SUNFLOWER | 0.95 | 0.91 | -4 | 0.4 | 1.19 | 198 | 1 | 0.94 | -6 | 0.8 | 1.14 | 43 | | | |
| SPRING WHEAT | 1.15 | 1.32 | 15 | 0.2 | 0.55 | 175 | 0.65 | 0.9 | 38 | 0.55 | 0.44 | -20 | | 0.25 | |
| WINTER WHEAT | 1 | 0.87 | -13 | 0.2 | 2.54 | 1170 | 0.6 | 0.81 | 35 | 0.5 | 0.48 | -4 | | 0.62 | |

CONTROL SYSTEM FOR CONTROLLING OPERATION OF AN IRRIGATION SYSTEM

RELATED APPLICATION

The current non-provisional patent application claims priority benefit, with regard to all common subject matter, to U.S. Provisional Application No. 62/442,252, filed Jan. 4, 2017, and titled "IRRIGATION SYSTEM CONTROL SYSTEM". The earlier-filed provisional application is hereby incorporated into the current patent application in its entirety.

BACKGROUND OF THE INVENTION

Field of the Invention

Embodiments of the current invention relate to control systems for irrigation systems.

Description of the Related Art

An irrigation system typically provides irrigation to a crop on a regular schedule from the time the crop is planted through the growing season until the crop is harvested. However, under certain circumstances during the growing season, it might not be economically viable to continue irrigation of the crop. For example, high costs of irrigation, low prices for the crop, and small percentage losses of the crop if irrigation is suspended are some of the factors that may contribute to the determination to decrease or even stop irrigation before the growing season has ended. Unfortunately, known irrigation systems do not adequately account for such circumstances and therefore, continue to irrigate crops when it is not economically justified to do so. In other situations, known irrigation systems may stop irrigation of crops before it is economically justified to do so.

SUMMARY OF THE INVENTION

Embodiments of the current invention solve the above-mentioned problems and provide a distinct advance in the art of irrigation systems by providing an irrigation system that includes a control system which calculates potential yield losses and the costs associated with the losses when determining whether to terminate irrigation before the end of a growing season.

The irrigation system may broadly comprise a plurality of mobile support towers, a conduit, a plurality of drive motors, a plurality of sensors, and the control system. The conduit is configured to carry fluid and may be supported by the mobile support towers. The conduit may include a valve which can be opened to allow fluid flow through the conduit and closed to prevent fluid flow through the conduit. Each drive motor is configured to propel one mobile support tower. Each sensor is configured to generate data regarding the amount of fluid used to irrigate the crop.

The control system includes a processing element configured to transmit electronic signals to the valve and the drive motors on a predetermined, scheduled basis to operate the valve and the drive motors to irrigate the crop. In accordance with one aspect of the current invention, the processing element calculates a yield loss to date which determines a percentage of the crop that will be lost if the crop is irrigated according to a predetermined schedule, calculates a potential forecasted yield loss which determines a percentage of the crop that will be lost if irrigation is terminated, calculates a price of forecasted yield loss as a difference of the potential forecasted yield loss and the yield loss to date times a price of the crop per amount, calculates a cost of irrigation as an operating cost, per amount of water, of irrigating times an amount of water scheduled to be used for irrigation, and terminates irrigation if the cost of irrigation is greater than the price of the forecasted yield loss.

Another embodiment of the current invention may provide a control system for determining yield losses for an irrigated crop comprising a communication element, a memory element, and a processing element. The communication element may send data to and receive data from a data server and an irrigation apparatus. The memory element may store data from the data server. The processing element is configured to calculate a per-day stress-adjusted crop water usage for a first time period of past days, calculate a total stress-adjusted crop water usage for the first time period of past days as a sum of each per-day stress-adjusted crop water usage, calculate a per-day no-stress crop water usage for the first time period of past days, calculate a total no-stress crop water usage for the first time period of past days as a sum of each per-day no-stress crop water usage, and calculate the yield loss to date as a crop specific yield response factor times a difference of 1 and a quotient of the total stress-adjusted crop water usage and the total no-stress crop water usage.

Yet another embodiment of the current invention may provide a control system for determining yield losses for an irrigated crop comprising a communication element, a memory element, and a processing element. The communication element may send data to and receive data from a data server and an irrigation apparatus. The memory element may store data from the data server. The processing element is configured to calculate a total stress-adjusted crop water usage for a first time period of past days as a sum of a plurality of per-day stress-adjusted crop water usage, calculate a total no-stress crop water usage for the first time period of past days as a sum of a plurality of per-day no-stress crop water usage, calculate a forecasted stress-adjusted crop water usage for a first time period of future days as a sum of a plurality of per-day stress-adjusted crop water usage, calculate a forecasted non-irrigation crop water usage as a sum of the total stress-adjusted crop water usage for the first time period of past days and the forecasted stress-adjusted crop water usage for the first time period of future days, calculate a forecasted no-stress crop water usage for the first time period of future days as a sum of a plurality of per-day no-stress crop water usage, calculate a forecasted scheduled-irrigation crop water usage as a sum of the total no-stress crop water usage for the first time period of past days and the forecasted no-stress crop water usage for the first time period of future days, and calculate a potential forecasted yield loss as the crop specific yield response factor times a difference of 1 and a quotient of the forecasted non-irrigation crop water usage and the forecasted scheduled-irrigation crop water usage.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
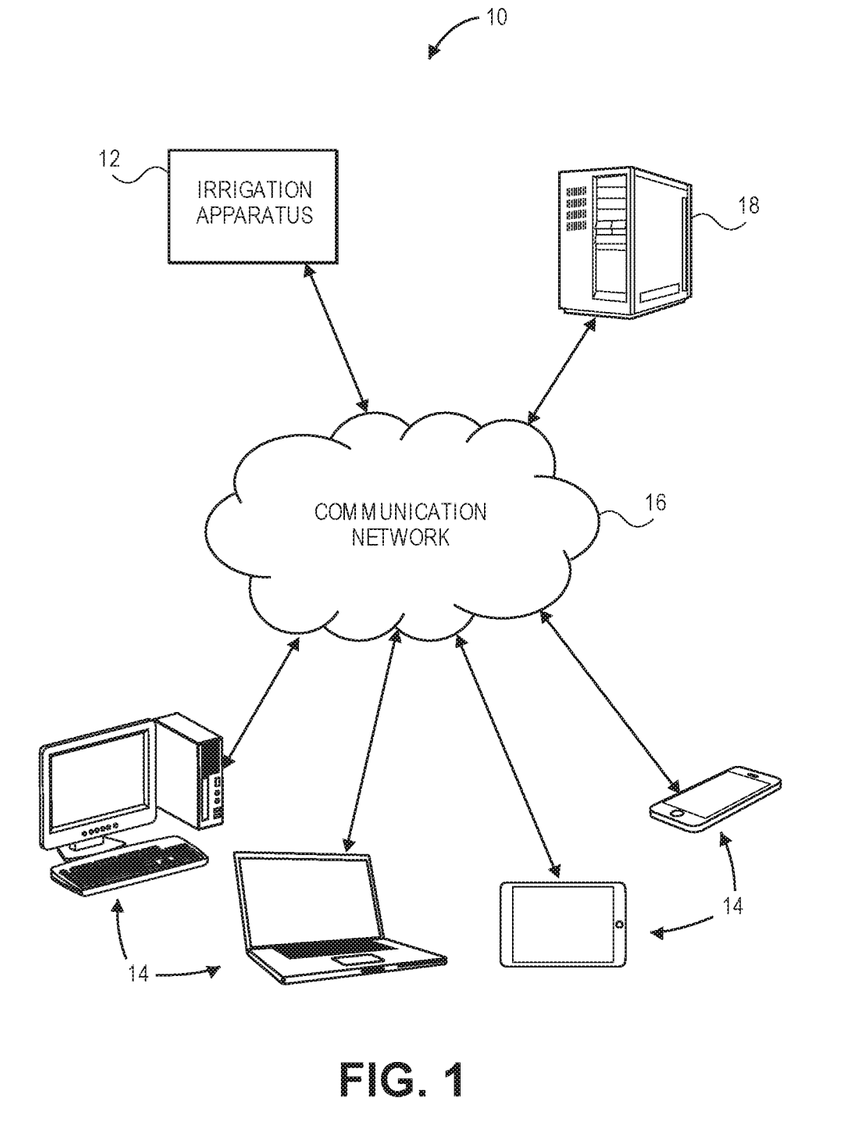
FIG. 1 is a block schematic diagram of an irrigation system, constructed in accordance with various embodiments of the current invention, interfacing with a communication network and a data server.

An irrigation system 10, constructed in accordance with various embodiments of the current invention, for providing irrigation to at least one crop is shown in FIG. 1. The irrigation system 10 may broadly comprise an irrigation apparatus 12, shown in FIG. 2, and a control system 14, shown in FIG. 3, for controlling the operation of the irrigation apparatus 12 based, at least in part, on calculations of potential yield losses and costs associated with the yield losses. In order to gather the information necessary to perform its calculations, the control system 14 may communicate through a communication network 16 with at least one data server 18. The yield losses calculated by the control system 14 may additionally or alternatively assist a grower in projecting profits and planning for harvest and storage activities.

Figure 2:
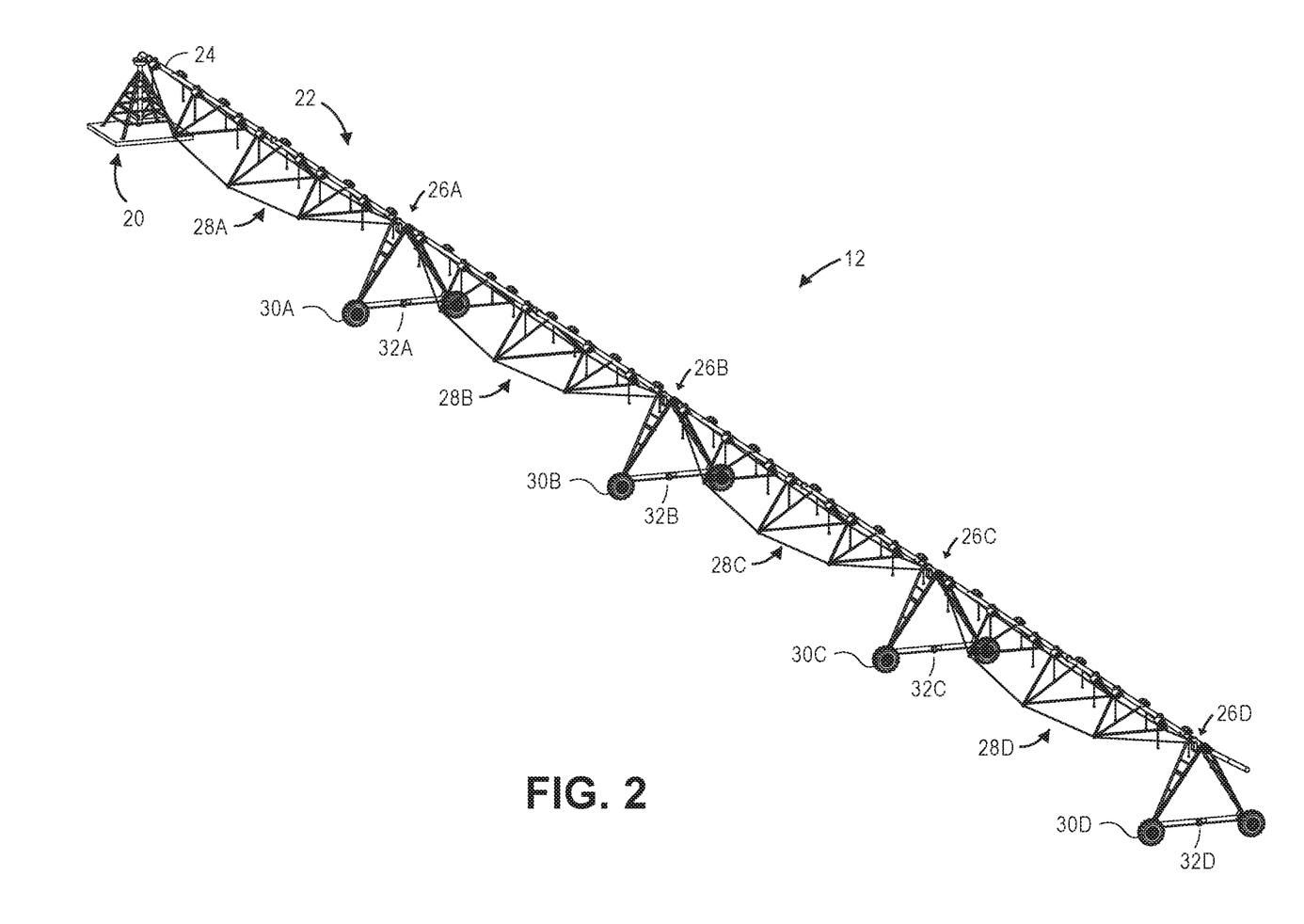
FIG. 2 is an overhead perspective view of an irrigation apparatus, a component of the irrigation system.

An exemplary embodiment of the irrigation apparatus 12, shown in FIG. 2, is a central pivot irrigation apparatus and broadly comprises a fixed central pivot 20 and a main section 22 pivotally connected to the central pivot. The irrigation apparatus 12 may also comprise an extension arm (also commonly referred to as a "swing arm" or "corner arm") pivotally connected to the free end of the main section. The irrigation apparatus 12 may also be embodied by a lateral, or linear, move apparatus without departing from the scope of the current invention.

The fixed central pivot 20 may be a tower or any other support structure about which the main section 22 may pivot. The central pivot has access to a well, water tank, or other source of water and may also be coupled with a tank or other source of agricultural products to inject fertilizers, pesticides and/or other chemicals into the water for application during irrigation. The central pivot 20 may supply water to a conduit 24 which carries the water along the length of the main section 22.

The main section 22 may comprise any number of mobile support towers 26A-D, the outermost 26D of which is referred to herein as an end tower. The support towers 26A-D are connected to the fixed central pivot 20 and to one another by truss sections 28A-D or other supports to form a number of interconnected spans.

The mobile towers have wheels 30A-D, at least one of which is driven by suitable drive motors 32A-D. Each motor 32A-D turns at least one of its wheels 30A-D through a drive shaft to propel its mobile tower 26 and thus the main section 22 in a circle about the central pivot 20 to irrigate a field. The motors 32 may also have several speeds or be equipped with variable speed drives. The operation of the motors 32A-D, such as whether they are on or off, the speed of travel, and the direction of travel, may be controlled with one or more electronic signals or digital data.

Each of the truss sections 28A-D carries or otherwise supports the conduit 24 and other fluid distribution mechanisms that are connected in fluid communication to the conduit 24. Fluid distribution mechanisms may include sprayers, diffusers, or diffusers, each optionally attached to a drop hose, or the like. In addition, the conduit 24 may include one or more valves 34 which control the flow of water through the conduit 24. The opening and closing of the valves 34 may be automatically controlled with an electronic signal or digital data.

The irrigation apparatus 12 may also include wired or wireless communication electronic components that communicate with the communication network 16 and allow the valves 34 and the motors 32 to receive the electronic signals and/or digital data which control the operation of the valves 34 and the motors 32.

The irrigation apparatus 12 may also include an optional extension arm (not shown) pivotally connected to the end tower 26D and may be supported by a swing tower with steerable wheels driven by a motor. The extension arm may be joined to the end tower 26D by an articulating pivot joint. The extension arm is folded in relative to the end tower 26D when it is not irrigating a corner of a field and may be pivoted outwardly away from the end tower 26D while irrigating the corners of a field.

The irrigation apparatus 12 illustrated in FIG. 2 has four mobile support towers 26A-D; however, it may comprise any number of mobile support towers, truss sections, wheels, and drive motors without departing from the scope of the current invention.

In accordance with aspects of the current invention, the irrigation apparatus 12 also includes an alignment control system for maintaining alignment of the mobile towers 26A-D while minimizing simultaneous power usage of the mobile tower drive motors 32A-D. The alignment control system will not be discussed in depth but may be implemented with hardware, software, firmware, or combinations thereof.

The irrigation apparatus 12 may further include one or more sensors 36 which measure the amount of water delivered from the irrigation apparatus 12 to the crop. The sensors 36 may communicate with the communication network 16 to report the amount of delivered water. The water may be reported as a depth in units of millimeters (mm) or inches (in).

The communication network 16 generally allows communication between the control system 14 and the irrigation apparatus 12 and the data server 18 as well as communication from one control system 14 to another. The communication network 16 may include the Internet, cellular communication networks, local area networks, metro area networks, wide area networks, cloud networks, plain old telephone service (POTS) networks, and the like, or combinations thereof. The communication network 16 may be wired, wireless, or combinations thereof and may include components such as modems, gateways, switches, routers, hubs, access points, repeaters, towers, and the like. The control systems 14 may connect to the communication network 16 either through wires, such as electrical cables or fiber optic cables, or wirelessly, such as RF communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

The data server 18 generally stores electronic data and may include application servers, database servers, file servers, web servers, or the like, or combinations thereof. Furthermore, the data server 18 may include a plurality of servers (perhaps geographically separated), virtual servers, or combinations thereof. The data server 18 may store and provide weather information such as current conditions, weather forecasts, rainfall measurements, rainfall forecasts, crop information such as coefficients for specific crops derived from dynamic crop growth models, as well as other meteorological and agricultural information. The data server 18 may be operated by government bodies, commercial enterprises, or the like, or combinations thereof.

Figure 3:
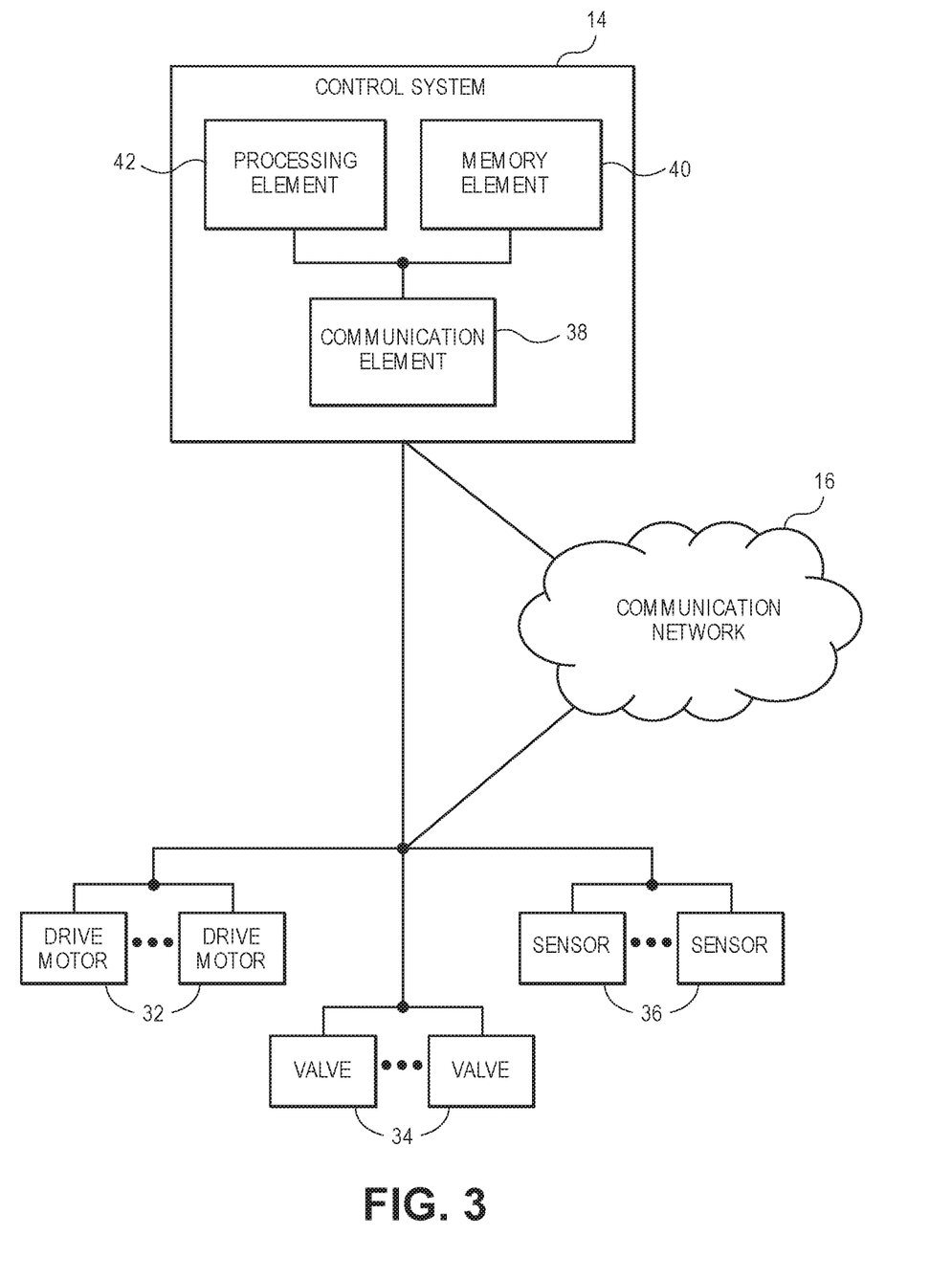
FIG. 3 is a block schematic diagram of a control system and other components of the irrigation system.

Turning now to the control system 14, as shown in FIGS. 1 and 3, it may be embodied by a workstation computer, a desktop computer, a laptop computer, a tablet computer, a smart phone, a smart watch, or the like. In some embodiments, the data server 18 may be integrated with, or housed with, the control system 14. The control system 14 may broadly comprise a communication element 38, a memory element 40, and a processing element 42. The control system 14 may also include user interface components, such as a monitor or display, a keyboard, a mouse, a touchscreen, or the like, which allow the user to enter and view information or data.

The communication element 38 generally allows the control system 14 to communicate with the communication network 16 or other control systems 14. The communication element 38 may include signal or data transmitting and receiving circuits, such as antennas, amplifiers, filters, mixers, oscillators, digital signal processors (DSPs), and the like. The communication element 38 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 38 may establish communication through connectors or couplers that receive metal conductor wires or cables which are compatible with networking technologies such as ethernet. In certain embodiments, the communication element 38 may also couple with optical fiber cables. The communication element 38 may be in communication with the processing element 42 and the memory element 40.

The memory element 40 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 40 may be embedded in, or packaged in the same package as, the processing element 42. The memory element 40 may include, or may constitute, a "computer-readable medium". The memory element 40 may store the instructions, code, code segments, software, firmware, programs, applications, apps, services, daemons, or the like that are executed by the processing element 42. The memory element 40 may also store settings, data, documents, sound files, photographs, movies, images, databases, and the like.

The processing element 42 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 42 may generally execute, process, or run instructions, code, code segments, software, firmware, programs, applications, apps, processes, services, daemons, or the like. The processing element 42 may also include hardware components such as finite-state machines, sequential and combinational logic, and other electronic circuits that can perform the functions necessary for the operation of the current invention. The processing element 42 may be in communication with the other electronic components through serial or parallel links that include universal busses, address busses, data busses, control lines, and the like.

Through hardware, software, firmware, or various combinations thereof, the processing element 42 may be programmed to, or configured to, perform the following tasks or functions. The processing element 42 may generate control signals that include one or more electronic signals and/or digital data which open and close the one or more valves 34 that control the flow of water through the conduit 24. The processing element 42 may also generate control signals that include one or more electronic signals and/or digital data which operate the motors 32, including whether the motors 32 are on or off, and the speed and direction of travel. The control signals may be transmitted using the communication element 38. In some embodiments, the control signals may be transmitted to the communication network 16 which transmits the signals to the components of the irrigation apparatus 12. In other embodiments, the control signals may be transmitted to the irrigation apparatus 12 directly either through wireless communication, such as Bluetooth™, etc., or through electrically conductive wires or cables.

The processing element 42 may receive information from the grower regarding the crop being irrigated. The information may include an area value, such as acreage, which the crop takes up as well as a yield value, perhaps as a volume, that the crop will produce. The information may also include a type, a brand, and a hybrid number of crop that was planted, as well as the date of planting. The information may further include coordinates, such as latitude and longitude, of the location of the crop. The user may enter a type of soil in which the crop is planted, or alternatively, the processing element 42 may retrieve the soil type from the data server 18 using the location of the crop. The processing element 42 may also retrieve data from the data server 18 that is derived from a dynamic crop growth model, wherein the data may include one or more crop coefficients for the particular type, brand, and hybrid model or variety number of the crop. The processing element 42 may execute an irrigation scheduling tool which receives all of the aforementioned data and determines a schedule of irrigation for the crop. The schedule may include a plan, such as a depth or volume of water which should be applied to the crop each irrigation cycle, wherein the irrigation cycle may be a 6-hour period, a 12-hour period, a 24-hour period, etc. The processing element 42 may then determine the length of time to open the valves 34 of the irrigation apparatus 12 as well as the duration and speed at which to operate the motors 32 in order to provide the depth of water indicated by the irrigation scheduling tool.

In addition, the processing element 42 may retrieve or receive historical weather data, particularly rainfall amounts, as well as weather forecasts and/or virtual weather data from the data server 18. Furthermore, the processing element 42 may retrieve or receive from the data server 18 a cost of water from a water supplier. The water cost may be per volume, such as a gallon or a liter, and may be updated hourly, daily, or weekly. The processing element 42 may also retrieve or receive commodity pricing for the current crop from the data server 18. The pricing may be given per volume, such as a bushel, and may be updated hourly, daily, or weekly. The processing element 42 may retrieve or receive data regarding the cost of operation of the irrigation apparatus 12, such as fuel costs, electricity costs, etc. All of the data mentioned above that is retrieved or received may be stored in the memory element 40.

The processing element 42 may perform the following calculations in order to determine yield losses of the crop. The processing element 42 may compute a stress-adjusted crop water usage $ET_{c,adj}$ and a no-stress crop water usage $ET_c$ for each day of a first time period which is historical and includes a plurality of previously occurring days. Crop water usage, in general, is the depth (amount) of water taken up, or used, by the crop through evaporation and/or transpiration (evapotranspiration). The processing element 42 may first calculate a soil-water depletion $D_i$ for a particular day (i) to determine if the crop was in stress for the particular day. The soil-water depletion $D_i$ may indicate the depth of water that has left the soil from a root zone of the crop, wherein the root zone is the depth, from the soil surface downward, that the roots of the crop occupy. The soil-water depletion $D_i$ may be calculated using the following equation:

$$D_i = D_{i-1} + ET_{c,i} - EP_i - I_i - CR_i \qquad \text{EQ. 1}$$

wherein $D_{i-1}$ is the soil water depletion for day i−1, which is the previous day. $ET_{c,i}$ is the crop water usage on day i assuming no stress on the crop and may be calculated as $ET_{o,i} \times K_{c,i}$, wherein $ET_{o,i}$ is a reference crop water usage for day i and is derived from standardized or historical data retrieved from the data server 18. $K_{c,i}$ is a crop coefficient for day i and is derived from a dynamic growth model retrieved from the data server 18. $EP_i$ is the effective precipitation on day i and may be retrieved from the data server 18, sensors with the irrigation apparatus 12, independent sensors, or combinations thereof. ER may be calculated as an actual precipitation, P, minus a runoff, Q, from the soil surface. $EP_i$ may indicate the depth of water that was absorbed by the soil. $I_i$ is the net irrigation depth applied on day i and may be retrieved from sensors with the irrigation apparatus 12. $I_i$ may indicate the depth of water applied by the irrigation apparatus 12 to the crop. $CR_i$ is a capillary rise from a groundwater table on day i. $CR_i$ may indicate the depth of water coming up from in ground water sources and is equal to zero for a water table that is greater than 1 meter below the bottom of the root zone.

The soil water depletion for the previous day i−1, $D_{i-1}$, may be calculated using EQ. 1 with the appropriate values for day i−1, or it may be retrieved from recorded values stored on the data server 18. However, when using the value of $D_{i-1}$ to calculate $D_i$, the processing element 42 may adjust the value of $D_{i-1}$ to account for deep percolation. The adjustment may be made with the following equation:

$$D_{i-1} = \begin{cases} 0, & D_{i-1} < 0 \\ D_{i-1}, & D_{i-1} \geq 0 \end{cases} \qquad \text{EQ. 2}$$

wherein if the value of $D_{i-1}$ is negative, indicating deep percolation, then $D_{i-1}$ gets set to zero. Otherwise, if the value of $D_{i-1}$ is positive, then it retains its value.

If the soil-water depletion $D_i$ is less than or equal to a readily available water value $RAW_i$, then the crop is not stressed. If the soil-water depletion $D_i$ is greater than the readily available water $RAW_i$, then the crop is stressed. The readily available water $RAW_i$ may be retrieved from the data server 18 and may indicate the depth of water that is accessible, or may be taken up, by the crop, which may vary according to the root zone depth, the field soil type, and the crop type, among others.

The processing element 42 may calculate a crop stress coefficient $K_s$ whose value varies according to whether the crop is stressed or not. When the crop is not stressed, for the particular day, the crop stress coefficient $K_{s,i}$ may have a value of 1. When the crop is stressed, the value of the crop stress coefficient $K_{s,i}$ may be a function of the soil-water depletion $D_i$, the readily available water $RAW_i$, and a total available water $TAW_i$. The total available water $TAW_i$ may be retrieved from the data server 18 and may indicate the maximum depth of water that the root zone of the crop can hold. The crop stress coefficient $K_{s,i}$ may be dynamically calculated using the following equation:

$$K_{s,i} = \begin{cases} 1, & D_i \leq RAW_i \text{(No stress)} \\ \dfrac{TAW_i - D_i}{TAW_i - RAW_i}, & D_i > RAW_i \text{(Stressed)} \end{cases} \qquad \text{EQ. 3}$$

The processing element 42 may calculate the stress-adjusted crop water usage $ET_{c,adj}$ as a function of the crop coefficient $K_{c,i}$, the crop stress coefficient $K_{s,i}$, and the reference crop water usage $ET_{o,i}$. The calculation of the stress-adjusted crop water usage $ET_{c,adj,i}$ may be given by the following equation:

$$ET_{c\ adj,i} = K_{c,i} \times K_{s,i} \times ET_{o,i} \qquad \text{EQ. 4}$$

If the crop is stressed, then the processing element 42 may calculate a stress-adjusted soil-water depletion $D_{adj,i}$ by utilizing the stress-adjusted crop water usage $ET_{c,adj}$, calculated above, in EQ. 1 instead of the non-stress crop water usage $ET_{c,i}$. The reason to adjust the soil-water depletion $D_i$ is to provide an accurate value of $D_{i-1}$ in the next day's calculation of the soil-water depletion $D_i$, since the calculation of the current day's soil-water depletion $D_i$ depends on the previous day's value.

The processing element 42 may calculate a total stress-adjusted crop water usage $ET_{c,actual\ to\ date}$, accounting for stress of the crop, from the plant date through yesterday using the following equation:

$$ET_{c,actual\ to\ date} = \Sigma_{i=Plant\ Date}^{Yesterday} ET_{c\ adj,i} \qquad \text{EQ. 5}$$

wherein "plant date" is the calendar date on which the crop in question was planted. "Yesterday" is yesterday's calendar date. $ET_{c\ adj,i}$ is the crop water usage adjusted for stress from EQ. 4 calculated for each day i from the plant date through yesterday.

The processing element 42 may calculate a total no-stress crop water usage $ET_{c,maximum\ to\ date}$, assuming that the crop was not stressed, from the plant date until yesterday using the following equation:

$$ET_{c,maximum\ to\ date} = \Sigma_{i=Plant\ Date}^{Yesterday} ET_{c,i} \qquad \text{EQ. 6}$$

wherein $ET_{c,i}$ is the no-stress crop water usage for day i calculated from EQ. 4 with the crop stress coefficient $K_{s,i}$ being equal to 1.

Figure 4:
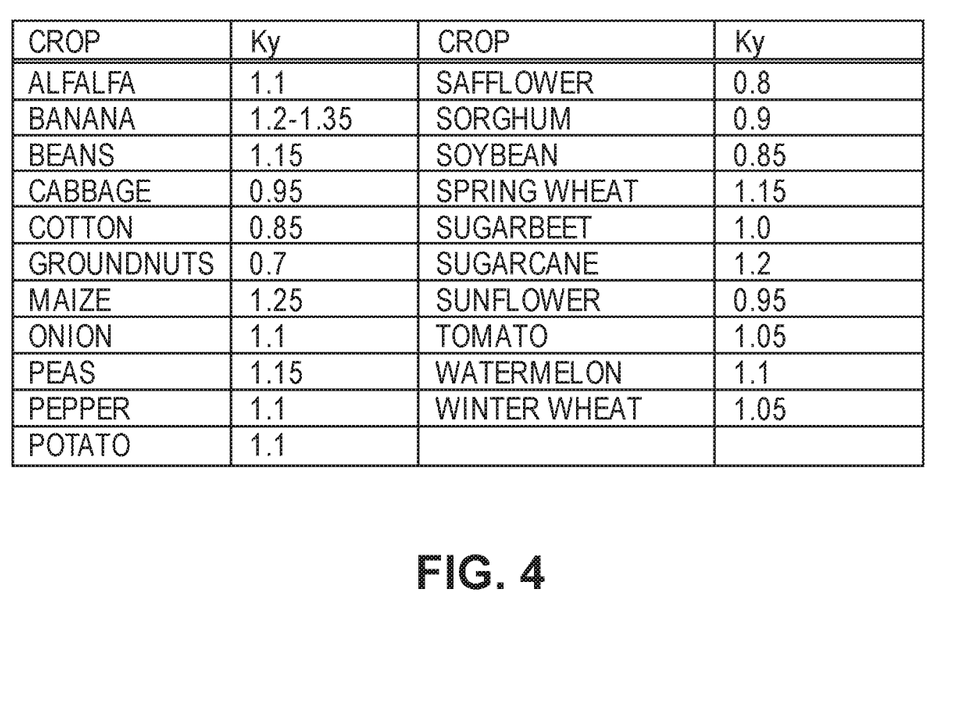
FIG. 4 is a table listing values of a response yield factor $K_y$ for various crops.
Figure 5:
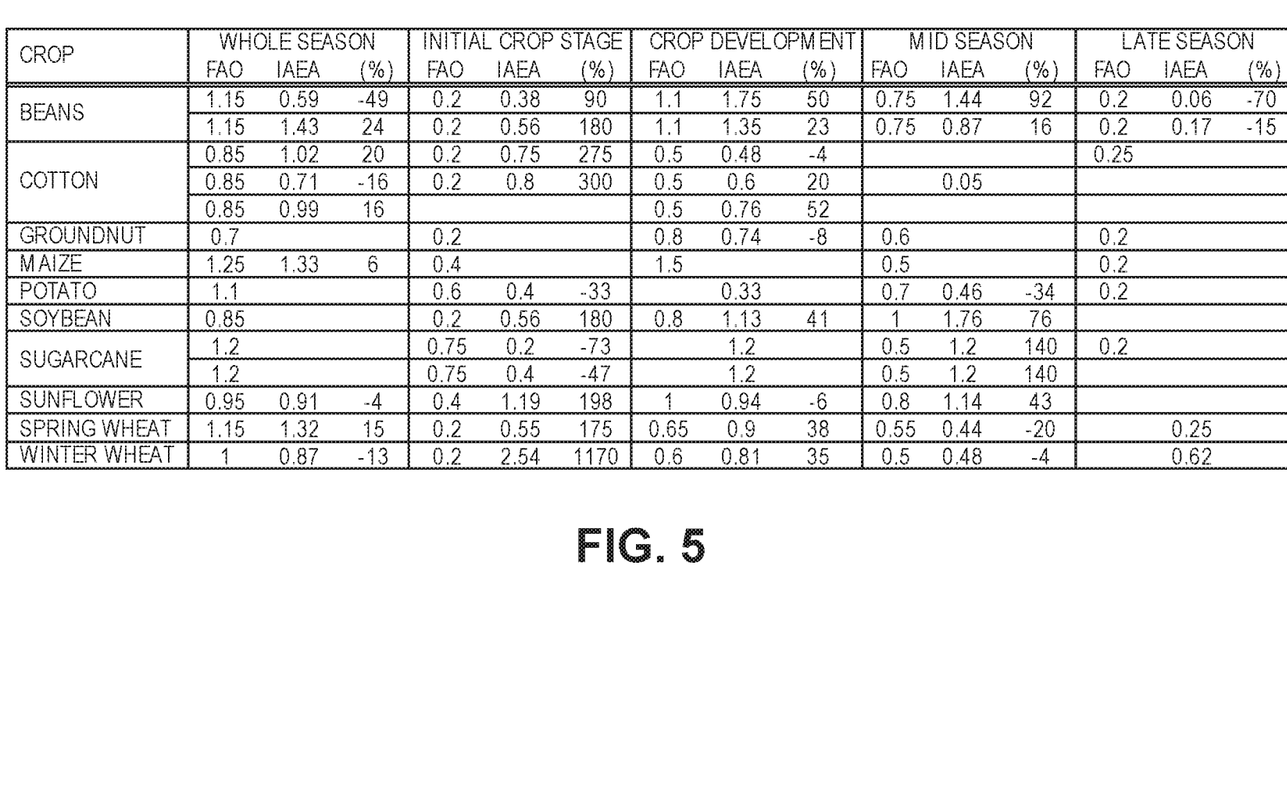
FIG. 5 is a table listing values of $K_y$ for FAO 33 and IAEA FAO 2002 at different stages of development for various crops.

Given the total crop water usage $ET_{c,actual\ to\ date}$, from EQ. 5 which accounts for crop stress, and the total crop water usage $ET_{c,maximum\ to\ date}$, from EQ. 6 which is ideal and assumes no crop stress, the processing element 42 may calculate a yield loss to date YLTD for the crop which indicates how much of the crop has been lost thus far due to crop stress, based on water usage. The YLTD may be calculated using the following equation:

$$YLTD = K_y \left(1 - \frac{ET_{c,actual\ to\ date}}{ET_{c,maximum\ to\ date}}\right) \times 100\% \qquad \text{EQ. 7}$$

wherein $K_y$ is a crop specific yield response factor derived from the Food and Agriculture Organization (FAO) 33, FAO 66, and/or from a crop growth model, all retrieved from the data server 18. Exemplary values of $K_y$ for various crops are shown in a table in FIG. 4. Additional exemplary values of $K_y$ for various crops are shown in a table in FIG. 5. The table includes five primary columns, one for the whole season, the initial crop stage, crop development, the mid season, and the late season. The table further includes secondary columns for each of the primary columns, wherein the secondary columns include a column for a $K_y$ value for FAO 33, a $K_y$ value for the International Atomic Energy Agency (IAEA) investigations (FAO 2002), and a percentage difference between the two $K_y$ values.

Figure 6:
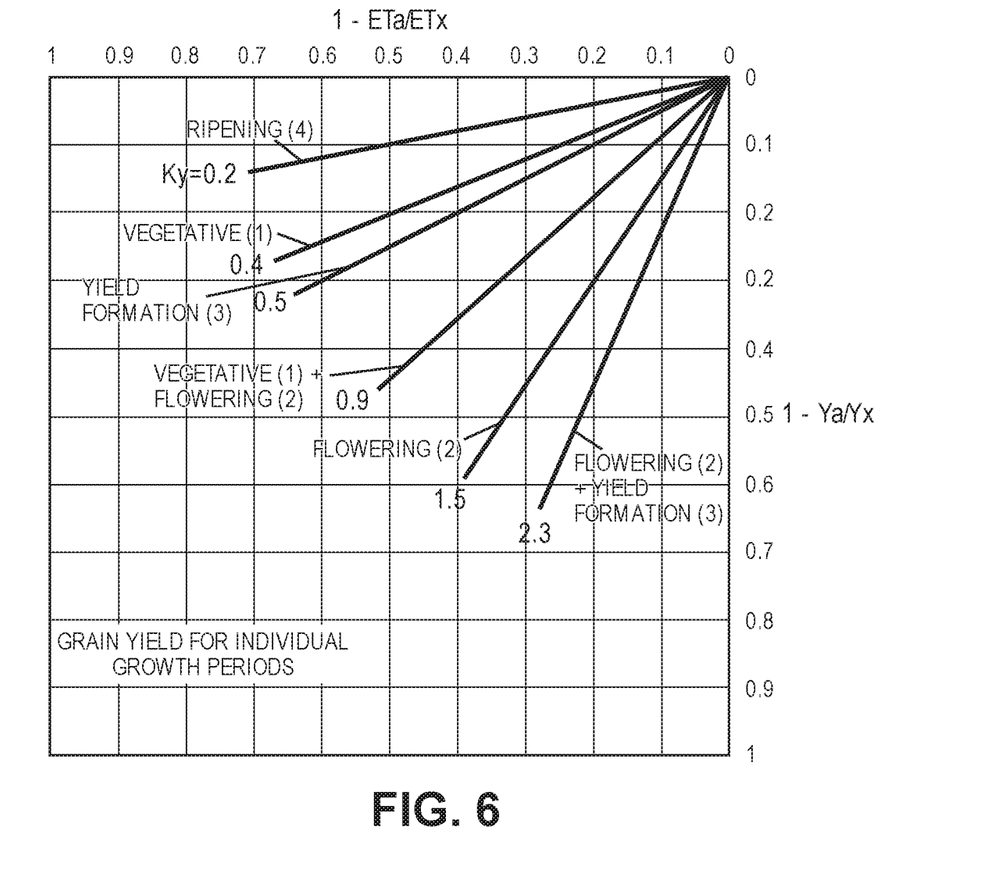
FIG. 6 is a plot of grain yield for individual growth periods for a crop of maize.

In addition, the grain yield for individual growth periods for a crop of maize are shown in a plot of FIG. 6. The plot graphs values of $1-ET_a/ET_x$ versus values of $1-Y_a/Y_x$. $ET_a$ is the total crop water usage $ET_c$, actual to date, from EQ. 5, and $ET_x$ is the total crop water usage $ET_{c,maximum\ to\ date}$, from EQ. 6. $Y_a$ is the actual crop yield, and $Y_x$ is the maximum crop yield, each of which may be calculated or derived elsewhere and retrieved from the data server 18. Each line that is plotted represents the yield for a particular value of $K_y$ and a particular stage of growth. The steeper the slope (i.e. the higher the $K_y$ value), the greater the reduction of yield for a given reduction in ET because of water deficits in the specific period.

The YLTD is also the percentage loss of the crop at the end of its lifetime assuming that the crop is irrigated according to the schedule provided by the irrigation scheduling tool for the remainder of the time from when the calculation is performed.

The processing element 42 may calculate a forecasted no-irrigation crop water usage $ET_{c,forecasted}$ for the lifetime of the crop, assuming that no irrigation is provided from the current day until the crop matures using the following equation:

$$ET_{c,forecasted} = \Sigma_{i=Plant\ Date}^{Yesterday} ET_{c\ adj,i} + \Sigma_{i=Today}^{Maturity Date} ET_{c\ adj,i} \qquad \text{EQ. 8}$$

wherein the calculation includes the total stress-adjusted crop water usage from EQ. 5 and a forecasted crop water usage utilizing EQ. 4 to calculate the stress-adjusted crop water usage $ET_{c\ adj,i}$ for each day i from the current day until the day that the crop matures. The values used to calculate $ET_{c\ adj,i}$ for future dates may be derived from computer models, projections, forecasts, or the like which may be retrieved from the data server 18. Furthermore, given that no irrigation is provided, $I_i$ is zero in EQ. 1 when calculating the soil-water depletion $D_i$ for each future date.

The processing element 42 may calculate a forecasted scheduled irrigation crop water usage $ET_{c,maximum\ forecasted}$ for the lifetime of the crop, assuming that irrigation is provided following the irrigation schedule from the current day until the crop matures using the following equation:

$$ET_{c,max\ forecasted} = \Sigma_{i=Plant\ Date}^{Yesterday} ET_{c,i} + \Sigma_{i=Today}^{Maturity\ Date} ET_{c,i} \qquad \text{EQ. 9}$$

wherein the calculation includes the total no-stress crop water usage from EQ. 6 and a forecasted no-stress crop water usage utilizing EQ. 4, with the crop stress coefficient $K_s$ being equal to 1 and using projected or modeled values for $D_i$, $RAW_i$, $TAW_i$, etc., to calculate the no-stress crop water usage $ET_{c,i}$ for each day i from the current day until the day that the crop matures.

Given the forecasted crop water usage with no future irrigation $ET_{c,forecasted}$ and the crop water usage with scheduled future irrigation $ET_{c,maximum\ forecasted}$, the processing element 42 may calculate the potential forecasted yield loss PFYL for the crop for the remainder of its lifetime, based on actual water usage and projected water usage, if no additional water is provided from the irrigation apparatus 12. The potential forecasted yield loss PFYL may be calculated using the following equation:

$$PFYL = K_y \left(1 - \frac{ET_{c,forecasted}}{ET_{c,maximum\ forecasted}}\right) \times 100\% \qquad \text{EQ. 10}$$

wherein $K_y$ is the crop specific yield response factor also used in EQ. 7.

The PFYL is the total percentage of the crop that will be lost if irrigation is terminated. The differential crop loss, PFYL–YLTD, is the percentage of the crop that will be lost from the current day until maturity of the crop if no more irrigation is performed. Since the processing element 42 has retrieved or received the market price of the crop, the processing element 42 may calculate the price of the forecasted loss by multiplying the price per amount, such as volume, times the amount of the crop that will be lost. From the irrigation scheduling tool, the processing element 42 may also retrieve or receive the amount of water that is scheduled to be used on the crop for the remainder of its lifetime. Since the processing element 42 has retrieved or received the cost of water, the processing element 42 may calculate the cost of continuing to irrigate as the operating cost per amount of water times the amount of water scheduled to be used. The processing element 42 may then compare the price of the forecasted crop loss with the cost of continuing to irrigate. If the cost of continuing to irrigate is greater than the price of the forecasted crop loss, then the processing element 42 may terminate irrigation at least until the next time the determination is performed. If the irrigation apparatus 12 is in the process of irrigating, then the processing element 42 may send signals to close water supply valves 34 and stop the drive motors 32A-D. If the cost of continuing to irrigate is less than or equal to the price of the forecasted crop loss, then the processing element 42 may send signals to the irrigation apparatus 12 to continue to irrigate on the schedule determined by the irrigation scheduling tool.

The processing element 42 may determine whether to continue irrigation of the crop on a regular basis, such as once per day or once every other day. Changes in the calculation variables make change the result of the determination. For example, changes in the cost of irrigation and the yield price of the crop, unexpected increases or decreases in the amount of rainfall, and the like, could make a difference in the determination of whether to continue irrigation of the crop. Thus, in some cases, the processing element 42 may restart irrigation, based on changes of circumstances, at a time after irrigation has been suspended.

The grower may use the YLTD or the PFYL, depending on whether irrigation will continue as scheduled or will stop, to project profits and plan for harvest and storage activities. The YLTD may be the projection of the crop yield assuming that irrigation continues as scheduled, whereas the PFYL may be the projection of the crop yield if irrigation is stopped due to the determination discussed above.

An example of the calculation of the yield losses YLTD, PFYL may be performed as follows. In order to calculate the potential yield losses, the processing element 42 may first calculate the crop water usage for a plurality of days. The calculation of crop water usage for a single day, e.g., Jul. 27, 2016, may utilize the following data. The user may enter the size of the crop, e.g., 100 acres, and the type of crop, e.g., a certain hybrid of corn. The processing element 42 may retrieve or receive the following values from the data server 18. $TAW_{July\ 27}$=66.9 mm, $RAW_{July\ 27}$=36.8 mm, $ET_{o,July\ 27}$=6.64 mm, $K_{c,July\ 27}$=1.2, $EP_{July\ 27}$=3.38 mm, $CR_{July\ 27}$=0 mm (since the water table is greater than 1 m below the root zone), and $D_{July\ 26}$ ($D_{i-1}$)=36.64 mm. The processing element 42 may receive the following irrigation depth value from the irrigation apparatus 12. $I_{July\ 27}$=0 mm. Given that soil-water depletion $D_{July\ 26}$ is greater than zero, the processing element 42 does not need to adjust the value of soil-water depletion $D_{i-1}$ from EQ. 2 while calculating the value of soil-water depletion $D_i$ from EQ. 1. Plugging the appropriate values into EQ. 1 yields the following:

$$D_{July\ 27}=36.64+(6.64\times1.2)-3.38-0-0=41.22\ mm$$

Since the soil-water depletion $D_{July\ 27}$ is greater than the readily available water $RAW_{July\ 27}$, the crop is stressed so the crop stress coefficient $K_{s,July\ 27}$ may be calculated by plugging the appropriate values into EQ. 3 as follows:

$$K_{s,July\ 27}=(66.9-41.22)/(66.9-36.8)=0.85$$

The stress-adjusted crop water usage $ET_{c,adj,\ July\ 27}$ may be calculated by plugging values from above into EQ. 4 as follows:

$$ET_{c,adj,July\ 27}=1.2\times0.85\times6.64=6.77\ mm$$

Since the crop was stressed for the day July 27, the processing element 42 may calculate the stress-adjusted soil-water depletion $D_{adj,i}$ as the following:

$$D_{adj,July\ 27}=36.64+6.77-3.38-0-0=40.03\ mm$$

To continue the example, the calculation of crop water usage for Jul. 28, 2016, may utilize the following data. $TAW_{July\ 28}$=66.9 mm, $RAW_{July\ 28}$=36.8 mm, $ET_{o,July\ 28}$=3.53 mm, $K_{c,July\ 28}$=1.2, $EP_{July\ 28}$=0 mm, $CR_{July\ 28}$=0 mm (since the water table is greater than 1 m below the root zone), $I_{July\ 28}$=15.48 mm, and $D_{July\ 27}$ ($D_{i-1}$)=40.03 mm. Plugging the appropriate values into EQ. 1 calculating the soil-water depletion $D_{July\ 28}$ yields the following:

$$D_{July28}=40.03+(3.53\times1.2)-0-15.48-0=28.79\ mm$$

Since the soil-water depletion $D_{July\ 28}$ is less than the readily available water $RAW_{July\ 28}$, the crop is no longer stressed and thus the stress coefficient $K_{s,July\ 28}$=1. The crop water usage $ET_{c,adj,July\ 28}$ may be found by plugging the following values into EQ. 4:

$$ET_{c,adj,July\ 28}=1.2\times1\times3.53=4.24\ mm$$

To calculate the yield losses, the processing element 42 may perform the above calculations for every day since the plant date, given in this example as May 4, 2016. The total stress-adjusted crop water usage $ET_{c,actual\ to\ date}$ may be calculated by plugging the appropriate values into EQ. 5 as follows:

$$ET_{c,actual\ to\ date}=\Sigma_{i=May\ 4,2016}^{July\ 27,2016}ET_{c\ adj,i}=351.9\ mm$$

The total no-stress crop water usage $ET_{c,maximum\ to\ date}$ may be calculated by plugging the appropriate values into EQ. 6 as follows:

$$ET_{c,maximum\ to\ date}=\Sigma_{i=May\ 4,2016}^{July\ 27,2016}ET_{c,i}=383.1\ mm$$

The yield loss to date YLTD may be calculated by plugging the appropriate numbers into EQ. 7 as follows:

$$YLTD=1.25(1-(351.9/383.1))\times100\%=10\%$$

The forecasted no-irrigation crop water usage $ET_{c,forecasted}$ may be calculated, given that the maturity date is Sep. 12, 2016, by plugging the appropriate values into EQ. 7 as follows:

$$ET_{c,forecasted}=\Sigma_{i=May\ 4,2016}^{July\ 27,2016}ET_{c\ adj,i}+\Sigma_{i=July\ 28,2016}^{September\ 12,2016}ET_{c\ adj,i}=457.8\ mm$$

The forecasted scheduled irrigation crop water usage $ET_{c,maximum\ forecasted}$ may be calculated by plugging the appropriate values into EQ. 8 as follows:

$$ET_{c,maxforecasted}=\Sigma_{i=May\ 4,2016}^{July\ 27,2016}ET_{c,i}+\Sigma_{i=July\ 28,2016}^{September\ 12,2016}ET_{c,i}=651.1\ mm$$

The potential forecasted yield loss PFYL may be calculated by plugging the appropriate values into EQ. 9 as follows:

$$PFYL=1.25(1-(457.8/651.1))\times100\%=37.1\%$$

The processing element 42 may determine whether to continue irrigating the crop. The price of the forecasted crop loss may be calculated as the market price multiplied by the amount of loss of the crop. Using exemplary values, the calculation is:

$3.50/bushel×220 bushel/acre×100 acres×(37.1%− 10%)=$20,867.00

The cost of irrigation may be calculated as the operating cost of irrigation multiplied by the amount of water scheduled to be used. Using exemplary values, the calculation is:

$15/acre/inch×100 acres×15 inches=$22,500.00

Since the price of the potentially lost crop is less than the cost of continuing to irrigate, the processing element 42 may at least suspend irrigation. The processing element 42 may repeat the calculations performed above on a regular basis. If the price of the crop increases and/or the cost of irrigation decreases after Jul. 27, 2016, then it would be economically viable to continue irrigation and the processing element 42 may send signals to the irrigation apparatus 12 to open water supply valves 34 and run the drive motors 32A-D as necessary to maintain the irrigation schedule as provided by the irrigation scheduling tool.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An irrigation system for providing irrigation to a crop, the irrigation system comprising:
    a plurality of mobile support towers;
    a conduit configured to carry fluid, the conduit supported by the mobile support towers and including a valve which can be opened to allow fluid flow through the conduit and closed to prevent fluid flow through the conduit;
    a plurality of drive configured to propel the support towers;
    at least one sensor configured to generate data regarding the amount of fluid used to irrigate the crop; and
    a control system configured to control operation of the valve and the drive motors, the control system including
        a processing element in electronic communication with a memory element, the processing element configured to
        transmit electronic signals to the valve and the drive motors according to a predetermined schedule to operate the valve and the drive motors to irrigate the crop,
        calculate a yield loss to date which determines a percentage of the crop that will be lost if the crop is irrigated according to the schedule,
        calculate a potential forecasted yield loss which determines a percentage of the crop that will be lost if irrigation is not provided according to the schedule,
        calculate a price of forecasted yield loss as a difference of the potential forecasted yield loss and the yield loss to date times a price of the crop per amount,
        calculate a cost of irrigation as an operating cost, per amount of water, of irrigating times an amount of water scheduled to be used for irrigation, and
        alter the schedule of transmission of the electronic signals to the valve and the drive motors if the cost of irrigation is greater than the price of the forecasted yield loss.

2. The irrigation system of claim 1, wherein the processing element is further configured to maintain the schedule of transmission of the electronic signals to the valve and the drive motors if the cost of irrigation is less than or equal to the price of the forecasted yield loss.

3. The irrigation system of claim 1, wherein the processing element is further configured to
    calculate a per-day stress-adjusted crop water usage for a first time period of past days,
    calculate a total stress-adjusted crop water usage for the first time period of past days as a sum of each per-day stress-adjusted crop water usage,
    calculate a per-day no-stress crop water usage for the first time period of past days,
    calculate a total no-stress crop water usage for the first time period of past days as a sum of each per-day no-stress crop water usage, and
    calculate the yield loss to date as a crop specific yield response factor times a difference of 1 and a quotient of the total stress-adjusted crop water usage and the total no-stress crop water usage.

4. The irrigation system of claim 3, wherein the processing element is further configured to
    calculate a per-day stress-adjusted crop water usage for a first time period of future days,
    calculate a forecasted stress-adjusted crop water usage for the first time period of future days as a sum of each per-day stress-adjusted crop water usage,
    calculate a forecasted non-irrigation crop water usage as a sum of the total stress-adjusted crop water usage for the first time period of past days and the forecasted stress-adjusted crop water usage for the first time period of future days,
    calculate a per-day no-stress crop water usage for the first time period of future days,
    calculate a forecasted no-stress crop water usage for the first time period of future days as a sum of each per-day no-stress crop water usage,
    calculate a forecasted scheduled-irrigation crop water usage as a sum of the total no-stress crop water usage for the first time period of past days and the forecasted no-stress crop water usage for the first time period of future days, and
    calculate the potential forecasted yield loss as the crop specific yield response factor times a difference of 1 and a quotient of the forecasted non-irrigation crop water usage and the forecasted scheduled-irrigation crop water usage.

5. The irrigation system of claim 4, wherein the per-day stress-adjusted crop water usage and the per-day no-stress crop water usage for the first time period of future days are calculated using projected values of precipitation, crop coefficients, and reference crop water usage.

6. The irrigation system of claim 4, wherein the processing element is further configured to
    calculate the per-day stress-adjusted crop water usage as a product of a crop coefficient, a crop stress coefficient, and a reference crop water usage, and
    calculate the per-day no-stress crop water usage as a product of the crop coefficient and the reference crop water usage,
    wherein the crop coefficient and the reference crop water usage are received from a data server and the value of the crop stress coefficient varies according to whether the crop is stressed or not.

7. The irrigation system of claim 6, wherein the processing element is further configured to determine that the crop is not stressed and the crop stress coefficient equals 1 if a per-day soil-water depletion is less than or equal to a per-day readily available water, and determine that the crop is stressed and the crop stress coefficient equals a difference of a per-day total available water and the per-day soil-water depletion divided by a difference of the per-day total available water and the per-day readily available water if the per-day soil-water depletion is greater than to the per-day readily available water, wherein the per-day readily available water and the per-day total available water are received from the data server.

8. The irrigation system of claim 7, wherein the processing element is further configured to calculate the per-day soil-water depletion as a previous day soil-water depletion minus a per-day effective precipitation minus an amount of irrigation from the irrigation system minus a capillary rise plus the product of the crop coefficient and the reference crop water usage, wherein the per-day effective precipitation and the capillary rise are received from the data server and the amount of irrigation is received from the sensors.

* * * * *